United States Patent
Burgard

[11] Patent Number: 5,822,379
[45] Date of Patent: Oct. 13, 1998

[54] DEVICE FOR RECEIVING DIGITAL SIGNALS

[75] Inventor: Francine Burgard, Grenoble, France

[73] Assignee: SGS-Thomson Microelectronics S.A., Saint Genis, France

[21] Appl. No.: 767,793

[22] Filed: Dec. 17, 1996

[30] Foreign Application Priority Data

Dec. 22, 1995 [FR] France ................................. 95 15788

[51] Int. Cl.$^6$ .............................. H03D 1/02; H03M 7/00; H03M 13/12
[52] U.S. Cl. .......................................... 375/341; 371/43.2
[58] Field of Search .................................. 375/341, 340, 375/342, 343, 316, 259, 260, 279, 280, 281, 261, 262, 265, 298, 320, 302, 322, 324, 328, 329, 332, 354; 371/30, 43.1, 43.4, 43.2, 43.6, 43.7, 43.8; 704/242, 236, 231, 200; 359/305, 560; 364/604, 724.12, 724.011, 728.01, 728.02, 812, 819, 820

[56] References Cited

U.S. PATENT DOCUMENTS

| | | |
|---|---|---|
| 3,373,404 | 3/1968 | Webb . |
| 4,462,101 | 7/1984 | Yasuda et al. ............................. 371/43 |
| 4,908,827 | 3/1990 | Gates ........................................ 371/43 |
| 5,438,590 | 8/1995 | Tzukerman et al. ..................... 375/259 |
| 5,566,189 | 10/1996 | Laskowski ................................ 371/30 |

OTHER PUBLICATIONS

French Search Report from French Patent Application 95 15788, filed Dec. 22, 1995.
Patent Abstracts of Japan, vol. 013, No. 023 (E–705), Jan. 19, 1989 & JP–A–63 227231 (Fujitsu Ltd.).
Patent Abstracts of Japan, vol. 95, No. 012 & JP–A–07 321673 (NEC Corp.).
Patent Abstracts of Japan, vol. 017, No. 599 (E–1455), Nov. 2, 1993 & JP–A–05 183449 (Hitachi).
Patent Abstracts of Japan, vol. 012, No. 420 (E–679), Nov. 8, 1988 & JP–A–63 156446 (Fujitsu Ltd.).

*Primary Examiner*—Chi H. Pham
*Assistant Examiner*—William Luther
*Attorney, Agent, or Firm*—Wolf, Greenfield & Sacks, P.C.

[57] ABSTRACT

The present invention relates to a device for receiving digital signals including a decoding device for generating p bits from q received signals, p and q being integers such that p is less than or equal to q, one bit of the p bits being generated from an integer number n of received signals, the decoding device including at least one signal processing circuit, the operation of which is clocked by a first clock signal having a frequency which depends on the frequency of reception of the signals received and at least one logic data processing circuit, the operation of which depends on both the receive frequency of the signals received and the number of signals necessary to generate a given bit, including circuitry for generating a second clock signal to clock the operation of the data processing circuit, this circuitry being constructed and arranged so that the second clock signal has a frequency equal to the receive frequency of the received signals and is active or inactive according to the number of received signals required to generate a bit.

10 Claims, 2 Drawing Sheets

Fig 5a CKL 
Fig 5b CKL0 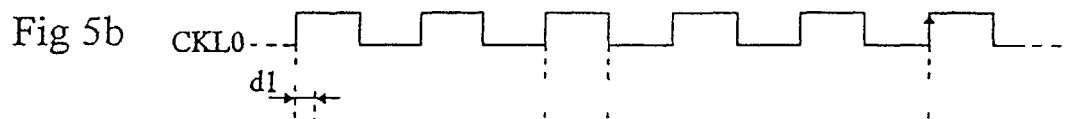
Fig 5c CKL1 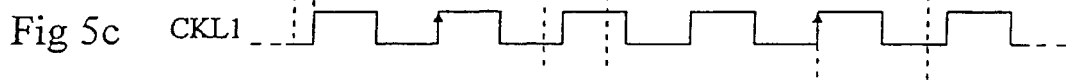
Fig 5d SELECT 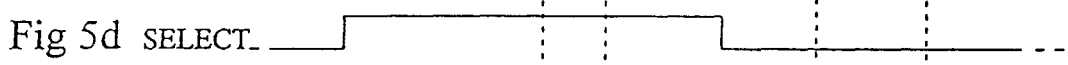
Fig 5e SELECT1 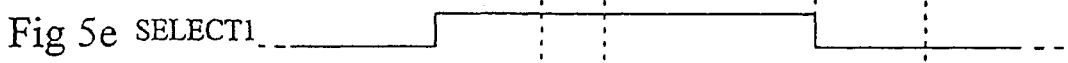
Fig 5f SELECT2 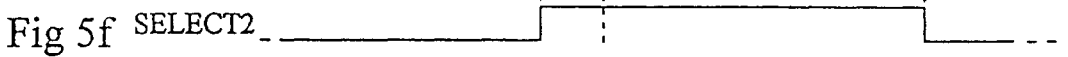
Fig 5g NDO 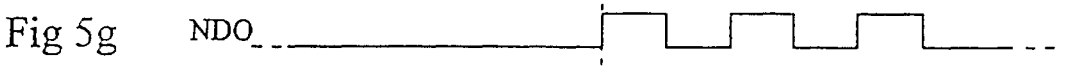
Fig 5h CKL2 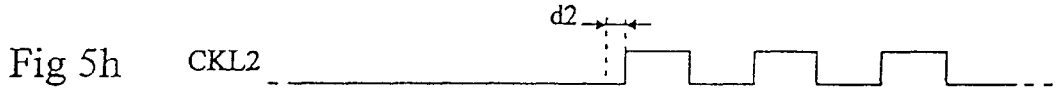

DEVICE FOR RECEIVING DIGITAL SIGNALS

BACKGROUND OF THE INVENTION

1. Field of the Invention

The present invention relates to a device for receiving digital signals. It more specifically relates to a decoding device controlled by several clock signals. It is of particular interest in the context of a transmission of digital signals using a punching.

2. Discussion of the Related Art

FIG. 1 schematically shows a standard device for receiving digital signals transmitted after being modulated. The device includes:

- a demodulation device 1 for demodulating the signal received by the receive device,
- an analog-to-digital converting device 2 converting the baseband signal (generated by the demodulation device) into a digital signal,
- a device 3 for extracting the phase and frequency of symbols and the carrier frequency, enabling synchronization of the operation of the receive device,
- a decoding device 4 for extracting decoded bits from received symbols.

A know information coding technology, the information being expressed as bits and concretely processed as digital signals, is the phase modulation. In QPSK transmission (quadrature phase modulation), the information is transmitted in the form of symbols. A symbol is comprised of two signals, one signal in phase and one signal in phase quadrature. If the symbol frequency is called Fs, the frequency of the reception of the signals in phase and in phase quadrature by the receive device is 2*Fs. In modulation phase in view of transmission, two signals (called derived signals) are generated from each bit to be transmitted from shift registers having their cell outputs combined in a logic fashion. The derived signals are then modulated and transmitted in the form of signals in phase or in phase quadrature. To increase the rate of the transmitted information, a so-called punching operation is performed on the data to be transmitted, that is, not all the derived signals are transmitted. In other words, a symbol will be representative of one bit (if its signals in phase and in phase quadrature are representative of the derived signals generated from one bit) or of several bits (if its signals in phase and in phase quadrature are representative of two derived signals generated from two different bits). Schematically, for p bits to be transmitted, q signals in phase or in phase quadrature (r=p/q represents the punching rate used) are generated. If for example r=3/4, four signals are used to transmit three data bits, that is, two symbols are used to transmit three bits. Two signals in phase and in phase quadrature of a given symbol can be representative of a same bit or of two consecutive bits. In practice, several punching rates are used, and the punching rate can vary over time. It is essential to determine the punching rate used upon transmission in the receive device and to synchronize the circuits of the receive device in order to avoid loss of data.

In the receive mode, the frequency of the bits to be processed in the decoding device, after suppressing the punching is equivalent to 2*Fs * r, that is, at most equal to the receive frequency of the signals in phase and in phase quadrature.

Decoding device 4, schematically illustrated in FIG. 2, includes 3 blocks:

- a device 4a for suppressing punching, which receives the symbols (signals in phase and in phase quadrature) as inputs and which generates binary data (representative of the original derived signals) and a SELECT signal,
- an actual decoder 4b (for example a Viterbi decoder) receiving the data and the signal generated by device 4a as inputs, and generating decoded bits from these signals,
- a device 4c for testing the punching rate, which retroactively controls device 4a (for example by comparing the symbols received by device 4a, by coding back the decoded bits from decoder 4b, and by comparing the obtained signals with one another) by means of one or several control signals CS supplied to device 4a.

In prior devices, the components of decoding device 4 are clocked by a clock signal having a frequency of 2*Fs, that is, the frequency of the signals in phase and in phase quadrature transmitted after being modulated. Now, only device 4a processes the signals in phase and in phase quadrature. That is, if the frequency of the clock signal used to clock the operation of device 4a must be 2*Fs, this condition no longer applies to the devices located upstream, which perform operations relative to the processing before punching of the bits upon transmission.

The state of the SELECT signal is representative of the number of signals in phase and/or in phase quadrature originally used to transmit the derived signals. It is used to clock the operation of decoder 4b and of device 4c. FIG. 3 illustrates an implementation of this signal in the decoder. In this drawing, a flip-flop B generates a datum OD. The flip-flop is clocked by a clock signal CKL, having a frequency 2*Fs. The flip-flop input is connected to the output of a multiplexer M receiving a signal ND and signal OD as inputs, the multiplexer being controlled by the SELECT signal. Thus, for each clock cycle, either the signal generated by the flip-flop is signal ND (SELECT=1), or it is maintained in its former state (SELECT=0). The punching rate used can thus be taken into account. According to whether the bits are originally coded over a fraction of symbol (or over an entire symbol), the data internal to the decoder will not (or will) be maintained in their former state.

The clocking mode illustrated hereabove has disadvantages. It causes significant congestion due to the presence of multiplexers coupled with the internal logic processing circuitry of the decoder. It further causes high power consumption, the power consumption of circuitry such as flip-flops being linked to the frequency of the clock signal clocking their operation. If the number of flip-flops in devices 4b and 4c is called N, the power consumption is Ct=Cb+Ca*2*Fs*N (Ca being a coefficient depending on the environment and on the technology used, and Cb being the power consumption which is not linked with the clock frequency). Besides, high congestion and power consumption cause error risks if the clock signal is weakened along its transmission line to the different circuits which use it.

SUMMARY OF THE INVENTION

An object of the present invention is to provide a device minimizing the congestion and power consumption of devices 4b and 4c by adapting the frequency of the clock signal used to clock the operation of these devices to the current punching rate used. The creation of a clock signal with a frequency of 2*Fs*r from a signal with a frequency of 2*Fs, the activation or the deactivation of which is controlled by the SELECT signal, is provided. Instead of connecting in a loop outputs of logic circuits on the inputs thereof by means of a multiplexer, the clocking signal of these circuits is deactivated (practically, this includes suppressing the edges of the clocking signal, which results in the processed data being maintained in a steady state). The use of multiplexers can thus be avoided and the power consumption of the logic circuits can be limited, the power consumption associated with the clock signal being a transient power consumption associated with the state switchings of the signal.

Thus, the present invention provides a device for receiving digital signals including a decoding device for generating p bits from q received signals, p and q being integers such that p is lower than or equal to q, one bit being generated from an integer number n of received signals, the decoding device including at least one signal processing circuit, the operation of which is clocked by a first clock signal having a frequency which depends on the receive frequency of the signals received and at least one logic data processing circuit, the operation of which depends on both the receive frequency of the signals received and at least one logic data processing circuit, the operation of which depends on both the receive frequency of the signals received and the number of signals required to generate a given bit, including means for generating a second clock signals to clock the operation of the data processing circuit, these means being constructed and arranged so that the second clock signal has a frequency equal to the receive frequency of the received signals and is active or inactive according to the number of received signals required to generate a bit.

According to an embodiment of the present invention, the second clock signal is a logic combination of a base clock signal and of a control signal, the state of which is a function of the number of signals required to generate a given bit.

According to an embodiment of the present invention, the second clock signal is generated by an AND-type logic gate receiving the base clock signal and the control signal.

According to an embodiment of the present invention, the control signal is generated by a first flip-flop, the operation of which is clocked by the base clock signal.

According to an embodiment of the present invention, the input of the first flip-flop is connected to the output of a second flip-flop, the operation of which is clock by the first clock signal.

According to an embodiment of the present invention, the first and second clock signals are in phase opposition when the second clock signal is active.

BRIEF DESCRIPTION OF THE DRAWINGS

Other characteristics and advantages of the present invention will appear from the following description of an embodiment of the present invention, taken in conjunction with the following drawings, but not limited by them, in which:

FIGS. 5a to 5h show timing diagrams of logic signals used in an implementation of the invention.

DETAILED DESCRIPTION

In the following description, it will be assumed, on the one hand, that the flip-flops are clocked by the rising edges (the so-called active edges) of the clock signals that they receive, and on the other hand that a clock signal CKL with a frequency 2*Fs is available.

Figure 1:
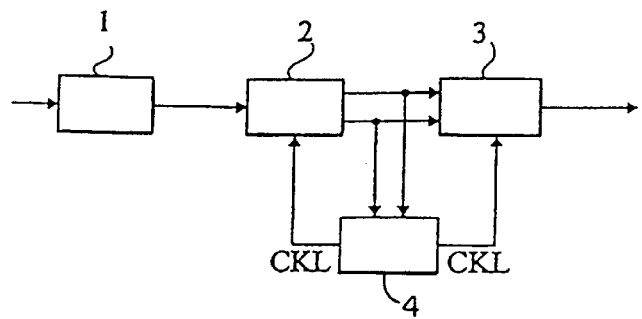
FIG. 1 schematically shows a conventional device for receiving digital signals.
Figure 2:
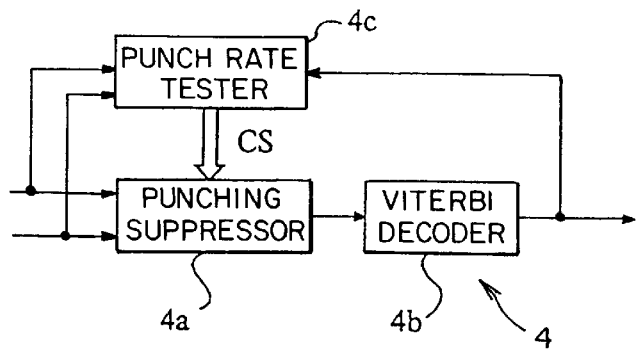
FIG. 2 schematically shows a decoding device of the receive device illustrated in FIG. 1.
Figure 3:
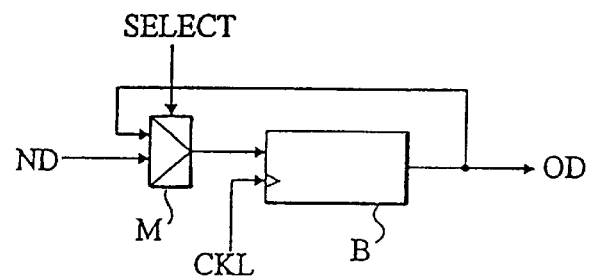
FIG. 3 shows an arrangement associating a flip-flop and a multiplexer used in the decoder of FIG. 2.
Figure 4:
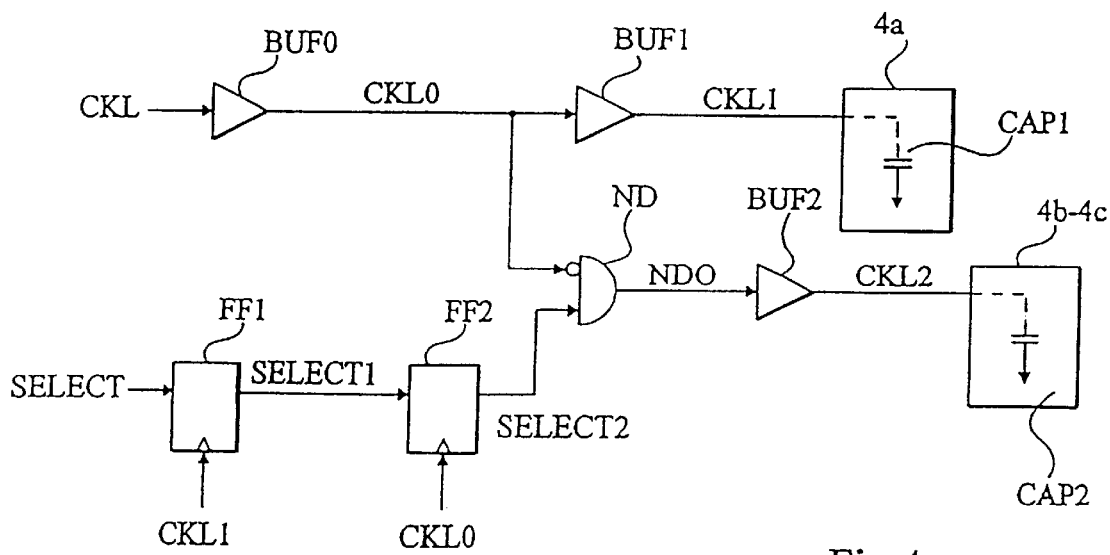
FIG. 4 shows a device for generating clock signals implemented according to the present invention.

The present invention provides the use of a device for generating clock signals illustrated in FIG. 4 to clock a decoding device such as shown in FIG. 2. Based on signal CKL, two clock signals CKL1 and CKL2 are generated. Signal CKL1, having a frequency 2*Fs, is used to clock the operation of device 4a. Signal CKL2 is used to clock the operation of decoder 4b and device 4c. The frequency of signal CKL2 is 2*Fs when active, and 0 when not active (it is then in a steady logic state, that is, there are no edges).

The date transiting from device 4a to decoder 4b transit from logic circuits having their operation clocked by signal CKL1 to logic circuits having their operation clocked by signal CKL2. The data (control signal CS) transiting from device 4c to device 4a transit from logic circuits having their operation clocked by signal CKL2 to logic circuits having their operation clocked by signal CKL1. The logic circuits considered are typically flip-flops. Consider the delay t1 between the active edges of signal CKL1 and the data input in flip-flops of decoder 4b (the operation of which is clocked by signal CKL2), and the delay t2 between the active edges of signal CKL2 and the data inputs in flip-flops of device 4a (the operation of which is clocked by signal CKL1). Assume that t1 and t2 are equivalent to a delay t. t must be less than the delay between the active edges of signals CKL1 and CKL2 and lower than the delay between the active edges of signals CKL2 and CKL1. The maximum operating frequency and the best security are obtained when the two signals are in phase opposition.

The circuit receives clock signal CKL via a buffer circuit BUF0 receiving signal CKL as an input and generating a so-called base clock signal CKL0. In practice, signal CKL0 is identical to signal CKL and slightly delayed with respect to the latter.

Clock signal CKL1 and clock signal CKL2 are provided based on signal CKL0. Signal CKL1 is generated by a buffer circuit BUF1 receiving CKL0 as an input. Signal CKL2 is generated by a buffer circuit BUF2 receiving a signal NDO as an input. The buffer circuits enable regeneration of the signals, that is, to produce voltage and current levels sufficient to be properly used, taking into account the loads receiving the signals.

The SELECT signal issued by device 4a is used to generate a control signal SELECT1, this signal being generated by a flip-flop FF1 receiving the SELECT signal as an input and clocked by clock signal CKL1. This signal SELECT1 is used to generate a control signal SELECT2, this signal being generated by a flip-flop FF2 receiving signal SELECT1 as an input and clocked by clock signal CKL0.

Eventually, signal SELECT2 is supplied to an input of an AND-type logic gate ND which also receives on an inverting input clock signal CKL0, and the output of which generates signal NDO.

Two capacities CAP1 and CAP2 have been shown in FIG. 4, respectively connected to the outputs of buffers BUF1 and BUF2, which symbolize the loads seen from the buffers circuits. The values of CAP1 and CAP2 are in practice calculated once the whole decoding device is defined, the sizing of the clock signal generators being, for the definition of a circuit, one of the last operations performed. By sizing buffers BUF1 and BUF2 so that the delay in buffer BUF1, knowing the value of CAP1, is equal to the delay in gate ND and buffer BUF2, knowing the value of CAP2, signals CKL1 and CKL2 in phase opposition are obtained (or course, when signal CKL2 is active).

The operation of the above-described circuit will know be explained. It will be assumed, as an example, that signals CKL, CKL0, CKL1, SELECT1, SELECT2, NDO and CKL2 are in the low state. Signal CKL2 is in the inactive state.

The occurrence of a rising edge on signal CKL (illustrated in FIG. 5a) causes shortly afterwards the occurrence of a rising edge on signal CKL0 (illustrated in FIG. 5b). This causes signal CKL1 (illustrated in FIG. 5c) to rise to a high state, with a delay d1 changing according to the value of equivalent capacity CAP1.

Imagine that control signal SELECT (illustrated in FIG. 5d) switches to the high state (which corresponds to the activation of signal CKL2). At the rising edge of signal CKL1 following this switching to the high state of the SELECT signal, signal SELECT1 (illustrated in FIG. 5e) switches to the high state. Then, at the following rising edge of signal CKL0, signal SELECT2 (illustrated in FIG. 5f) switches to the high state. From this time on, signal NDO (illustrated in FIG. 5g) varies in phase opposition to signal CKL0. Signal CKL2 (illustrated in FIG. 5h) then copies signal NDO (that is, CKL0) with a delay d2 varying according to equivalent capacity CAP2.

In practice, the values of CAP1 and CAP2 are easily determined by simulation. Buffer circuits BUF1 and BUF2 can thus be sized so that clock signals CKL1 and CKL2 are in phase opposition.

Symmetrically, the falling to the low state of the SELECT signal causes the falling of signal SELECT1 at the following rising edge of signal CKL1, and then the falling of signal SELECT2 at the following rising edge of signal CKL0. This causes signal NDO to be maintained in the high state and, later, the deactivation of signal CKL2.

The use of flip-flop FF2 enables suppression of the possible risk of generating parasitic pulses in signal CKL2. Indeed, in the circuit illustrated in FIG. 4, signal SELECT2 can only change states on an active (rising) edge of clock signal CKL0. Gate ND also receives signal CKL0 on an inverting input. If signal SELECT2 is in a given state, a state switching of signal NDO can this only possibly occur on a falling edge of signal CKL0. By clocking the operation of flip-flop FF2 on the rising edges of signal CKL0, the steadiness of the state of signal SELECT2 is ensured at the falling edges of signal CKL0.

If the punching rate is r, then the power consumption in devices 4b and 4c for N flip-flops becomes Ct=Cb+r*(Ca*2*Fs*N). It is equivalent to the power consumption of N flip-flops clocked by a clock signal with a frequency of r*(2*Fs).

Although the present invention has been described with reference to a QPSK-type modulation, it can of course be extended to any type of transmission implementing a punching.

Of course, the present invention is likely to have various alterations, modifications, and improvements which will readily occur to those skilled in the art. Such alterations, modifications, and improvements which will readily occur to those skilled in the art. Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A device for receiving digital signals including:

a decoding device for generating p bits from q received signals, p and q being integers such that p is less than or equal to q, one bit of the p bits being generated from an integer number n of the received signals, the decoding device including at least one signal processing circuit, the operation of which is clocked by a first clock signal having a frequency which depends on a frequency of reception of the received signals and at least one logic data processing circuit that operation of which depends on both the frequency of the received signals and the number of signals required to generate a given bit; and means for generating a second clock signal to clock operation of the logic data processing circuit, said means for generating being constructed and arranged so that the second clock signal has a frequency equal to the frequency of the received signals and is active or inactive according to the number of received signals required to generate the given bit.

2. A device according to claim 1, wherein the second clock signal is a logical combination of a base clock signal and of a control signal, a state of which is a function of the number of signals required to generate the given bit.

3. A device according to claim 2, wherein the second clock signal is generated by an AND-type logic gate receiving the base clock signal and the control signal.

4. A device according to claim 2, wherein the control signal is generated by a first flip-flop, the operation of which is clocked by the base clock signal.

5. A device according to claim 4, wherein the input of the first flip-flop is connected to the output of a second flip-flop, the operation of which is clocked by the first clock signal.

6. A device according to claim 1, wherein the first and second clock signals are in phase opposition when the second clock signal is active.

7. A device according to claim 1, wherein the first and second clock signals are generated by buffer circuits.

8. A device according to claim 1, wherein in the signal processing circuit suppresses punching.

9. A device according to claim 1, wherein the decoding device includes a decoder, the operation of which is clocked by the second clock signal.

10. A device according to claim 9, wherein the decoder is a Viterbi decoder.

* * * * *